(12) United States Patent
Vetters et al.

(10) Patent No.: US 10,301,955 B2
(45) Date of Patent: May 28, 2019

(54) SEAL ASSEMBLY FOR GAS TURBINE ENGINE COMPONENTS

(71) Applicants: Rolls-Royce North American Technologies, Inc., Indianapolis, IN (US); Rolls-Royce Corporation, Indianapolis, IN (US)

(72) Inventors: Daniel K. Vetters, Indianapolis, IN (US); Aaron D. Sippel, Zionsville, IN (US)

(73) Assignees: Rolls-Royce North American Technologies Inc., Indianapolis, IN (US); Rolls-Royce Corporation, Indianapolis, IN (US)

(*) Notice: Subject to any disclaimer, the term of this patent is extended or adjusted under 35 U.S.C. 154(b) by 158 days.

(21) Appl. No.: 15/363,730

(22) Filed: Nov. 29, 2016

(65) Prior Publication Data

US 2018/0149029 A1    May 31, 2018

(51) Int. Cl.
*F01D 11/00* (2006.01)
*F16J 15/02* (2006.01)
*F01D 11/08* (2006.01)

(52) U.S. Cl.
CPC .......... *F01D 11/003* (2013.01); *F01D 11/005* (2013.01); *F16J 15/022* (2013.01); *F01D 11/08* (2013.01); *F05D 2220/32* (2013.01); *F05D 2230/642* (2013.01); *F05D 2240/307* (2013.01); *F05D 2260/30* (2013.01); *F05D 2260/85* (2013.01); *F05D 2300/6033* (2013.01); *Y02T 50/672* (2013.01)

(58) Field of Classification Search
CPC ........ F01D 11/003; F01D 11/08; F01D 11/00; F01D 11/005; F16J 15/022; F05D 2220/32; F05D 2240/307; F05D 2240/301; F05D 2300/6033; F05D 2230/462; F05D 2260/30; F05D 2260/85; Y02T 50/672
USPC .......................................................... 277/591
See application file for complete search history.

(56) References Cited

U.S. PATENT DOCUMENTS

| | | | |
|---|---|---|---|
| 1,423,466 A | 7/1922 | Snyder | |
| 3,375,016 A | 3/1968 | Jellinek et al. | |
| 3,661,197 A | 5/1972 | Peterson | |
| 3,990,813 A * | 11/1976 | Imai | F01D 5/22 416/196 R |
| 4,635,896 A | 1/1987 | Baker | |
| 5,188,506 A | 2/1993 | Creevy | |
| 5,988,975 A | 11/1999 | Pizzi | |

(Continued)

FOREIGN PATENT DOCUMENTS

| | | |
|---|---|---|
| CA | 2929244 A1 | 11/2016 |
| EP | 1832716 A2 | 9/2007 |

(Continued)

OTHER PUBLICATIONS

Extended European Search Report completed Mar. 28, 2018 and issued in connection with EP Appln. No. 17203010.8.

(Continued)

*Primary Examiner* — Nathan Cumar
(74) *Attorney, Agent, or Firm* — Barnes & Thornburg LLP (57) ABSTRACT

A gas turbine engine assembly includes adjacent components and a seal assembly. The seal assembly being configured to block gasses from passing through the interface of the adjacent components.

17 Claims, 8 Drawing Sheets

(56) References Cited

U.S. PATENT DOCUMENTS

| | | | |
|---|---|---|---|
| 6,273,683 B1 * | 8/2001 | Zagar | F01D 5/22 277/421 |
| 6,464,456 B2 | 10/2002 | Darolia et al. | |
| 6,808,363 B2 | 10/2004 | Darkins, Jr. et al. | |
| 6,832,484 B2 | 12/2004 | Hofmann et al. | |
| 6,893,214 B2 | 5/2005 | Alford et al. | |
| 7,080,513 B2 | 7/2006 | Reichert | |
| 7,347,425 B2 | 3/2008 | James | |
| 7,360,769 B2 | 4/2008 | Bennett | |
| 7,374,395 B2 | 5/2008 | Durocher et al. | |
| 7,520,721 B2 | 4/2009 | Hamlin et al. | |
| 7,744,096 B2 | 6/2010 | Kono | |
| 7,771,159 B2 | 8/2010 | Johnson et al. | |
| 7,870,738 B2 | 1/2011 | Zborovsky et al. | |
| 8,047,550 B2 | 11/2011 | Behrens et al. | |
| 8,047,773 B2 | 11/2011 | Bruce et al. | |
| 8,079,600 B2 | 12/2011 | Shojima et al. | |
| 8,157,511 B2 | 4/2012 | Pietrobon et al. | |
| 8,303,245 B2 | 11/2012 | Foster et al. | |
| 8,790,067 B2 | 7/2014 | McCaffrey et al. | |
| 2004/0195783 A1 | 10/2004 | Akagi et al. | |
| 2006/0257262 A1 * | 11/2006 | Itzel | F01D 5/22 416/248 |
| 2008/0069688 A1 | 3/2008 | Harper et al. | |
| 2009/0097980 A1 | 4/2009 | Hayasaka et al. | |
| 2010/0080699 A1 | 4/2010 | Pietrobon et al. | |
| 2012/0070272 A1 | 3/2012 | Prehn | |
| 2012/0171040 A1 * | 7/2012 | Walunj | F01D 5/22 416/220 R |
| 2012/0235366 A1 * | 9/2012 | Walunj | F01D 5/3007 277/647 |
| 2013/0156550 A1 * | 6/2013 | Franks | F01D 11/08 415/126 |
| 2013/0202433 A1 | 8/2013 | Hafner | |
| 2014/0144157 A1 * | 5/2014 | Cairo | F01D 5/3092 60/805 |
| 2016/0245108 A1 | 8/2016 | Sippel et al. | |
| 2016/0348521 A1 | 12/2016 | Sippel et al. | |

FOREIGN PATENT DOCUMENTS

| | | | |
|---|---|---|---|
| EP | 2286066 A2 | 2/2011 | |
| JP | 58176402 A | 10/1983 | |
| JP | 2000204901 A | 7/2000 | |
| JP | 5776208 B2 | 9/2015 | |
| WO | 20090126191 A2 | 10/2009 | |

OTHER PUBLICATIONS

GE Aviation, Jefferies Investor Visit, dated May, 12, 2014, 78 pg. (p. 32).

* cited by examiner

SEAL ASSEMBLY FOR GAS TURBINE ENGINE COMPONENTS

FIELD OF THE DISCLOSURE

The present disclosure relates generally to gas turbine engines, and more specifically to seals used in gas turbine engines.

BACKGROUND

Gas turbine engines are used to power aircraft, watercraft, power generators, and the like. Adjacent components in a gas turbine engine are often separated by a small gap sometimes called a split line. The small gap allows for variations in manufacturing tolerance of the adjacent components and for expansion/contraction of the components that occurs during operation of the gas turbine engine.

The small gaps between adjacent components may be sealed to prevent the leakage of air through the small gaps during operation of the turbine engine. Seals used to block the leakage of air through the small gaps are sometimes designed to account for changes in the dimension of the gap to be closed.

SUMMARY

The present disclosure may comprise one or more of the following features and combinations thereof.

A gas turbine engine assembly may include a first component, a second component, and a seal assembly. The first component and the second component may comprise ceramic matrix materials. The first component may include a first panel formed to include a first chamfer surface and a first attachment feature that extends from the first panel to mount the first panel relative to other components within the gas turbine engine assembly. The second component may include a second panel formed to include a second chamfer surface and a second attachment feature that extends from the second panel to mount the second panel relative to other components within the gas turbine engine assembly. The seal assembly may be arranged in a channel formed by the first chamfer and the second chamfer when the first component is arranged in confronting relation to the second component.

The seal assembly may include a rod seal and a biaser seal. The rod seal may be configured to block gasses from passing through the channel. The biaser seal may be configured to block gasses from passing through an interface between the first attachment feature and the second attachment feature. The biaser seal may be engaged with the rod seal and may be configured to push the rod seal toward engagement with the first panel and the second panel.

In some embodiments, the biaser seal may include an inner strip seal and a biaser. The inner strip seal may be arranged in slots formed in the first attachment feature and the second attachment feature that engages the rod seal. The biaser may be arranged, at least in part, in the slots formed in the first attachment feature and the second attachment feature. The biaser may be configured to push the inner strip seal toward the rod seal.

In some embodiments, the inner strip seal may include a seal strip and a step that extends from the seal strip. The biaser may engage the step of the inner strip seal.

In some embodiments, the step may be one of integral to and brazed to the seal strip. In some embodiments, the inner strip seal may include a seal strip and a hook end. The biaser may engage the hook end of the inner strip seal.

In some embodiments, the gas turbine engine assembly may further include a ground component arranged adjacent to the first attachment feature and the second attachment feature opposite the first panel and the second panel. The biaser seal may include an outer strip seal arranged in the slots formed in the first attachment feature and the second attachment feature that engages the ground component. The biaser of the biaser seal may be configured to push the outer strip seal toward the ground component. In some embodiments, the outer strip seal may overlap the inner strip seal within the slots formed in the first attachment feature and the second attachment feature.

In some embodiments, the biaser may include a bent strip of single-thickness material formed to include an inner pusher portion, an outer pusher portion, and a spring portion. The inner pusher portion may be located in the slots. The outer pusher portion may be located in the slots. The spring portion may interconnect the inner pusher portion and the outer pusher portion. The inner pusher portion may be arranged to engage the inner strip seal. The outer pusher portion may be arranged to engage the outer strip seal. The spring portion may be shaped to bias the inner pusher portion away from the outer pusher portion.

In some embodiments, the spring portion may be arranged outside the slots formed in the first attachment feature and the second attachment feature. In some embodiments, the spring portion may be arranged inside the slots formed in the first attachment feature and the second attachment feature. In some embodiments, at least a portion of one of the inner strip seal and the outer strip seal may be narrower than the inner pusher portion and the outer pusher portion of the biaser.

According to another aspect of the present disclosure, a gas turbine engine assembly may include a first component, a second component, and a biaser seal. The first component may be formed to include a first slot that extends into the first component. The second component may be formed to include a second slot that extends into the second component. The second component may be arranged adjacent to the first component to create an interface therebetween. The biaser seal may be configured to block gasses from passing through the interface between the first component and the second component. The biaser seal may include a first strip seal and a biaser. The first strip seal may be arranged in the first slot formed in the first component and the second slot formed in the second component to close a gap between the first component and the second component. The biaser may be arranged, at least in part, in the first slot formed in the first component and the second slot formed in the second component. The biaser may be configured to push the first strip seal toward a first end of the respective first and second slots.

In some embodiments, the first strip seal may include a seal strip and a step that extends from the seal strip. The biaser may engage the step of the inner strip seal.

In some embodiments, the step may be one of integral to and brazed to the seal strip. In some embodiments, the inner strip seal may include a seal strip and a hook end. The biaser may engage the hook end of the inner strip seal.

In some embodiments, the biaser seal may include a second strip seal arranged in the first slot formed in the first component and the second slot formed in the second component to close a gap between the first component and the second component. The biaser of the biaser seal may be configured to push the second strip seal toward a second end of the respective first and second slots, opposite the first end.

In some embodiments, the second strip seal may overlap the first strip seal within the first slot and the second slot.

In some embodiments, the biaser may include a bent strip of single-thickness material formed to include an inner pusher portion, an outer pusher portion, and a spring portion. The inner pusher portion may be located in the first slot and the second slot. The outer pusher portion may be located in the first slot and the second slot. The spring portion may interconnect the inner pusher portion and the outer pusher portion. The inner pusher portion may be arranged to engage the inner strip seal. The outer pusher portion may be arranged to engage the second strip seal. The spring portion may be shaped to bias the inner pusher portion away from the outer pusher portion.

In some embodiments, the spring portion may be arranged outside the first slot formed in the first component and the second slot formed in the second component. In some embodiments, the spring portion may be arranged inside the first slot formed in the first component and the second slot formed in the second component.

These and other features of the present disclosure will become more apparent from the following description of the illustrative embodiments.

DETAILED DESCRIPTION

For the purposes of promoting an understanding of the principles of the disclosure, reference will now be made to a number of illustrative embodiments shown in the drawings and specific language will be used to describe the same.

Figure 1:
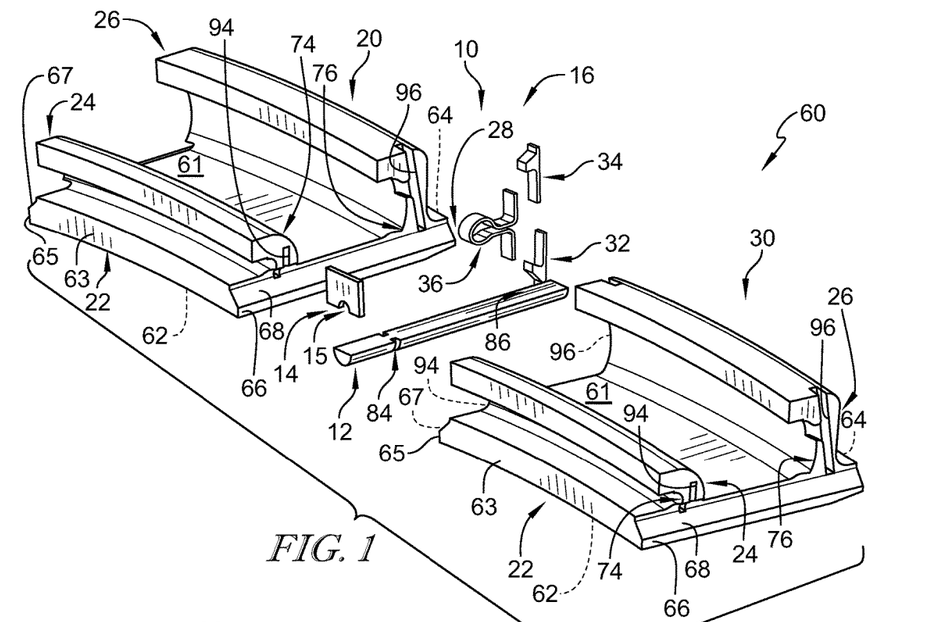
FIG. 1 is an exploded perspective view of a gas turbine engine assembly including a first blade track component, a second blade track component, and a seal assembly adapted to block gasses from passing through a gap formed at an interface between the first blade track component and the second blade track component showing that the seal assembly includes a rod seal, an axial-locator seal, and a biaser seal.
Figure 2:
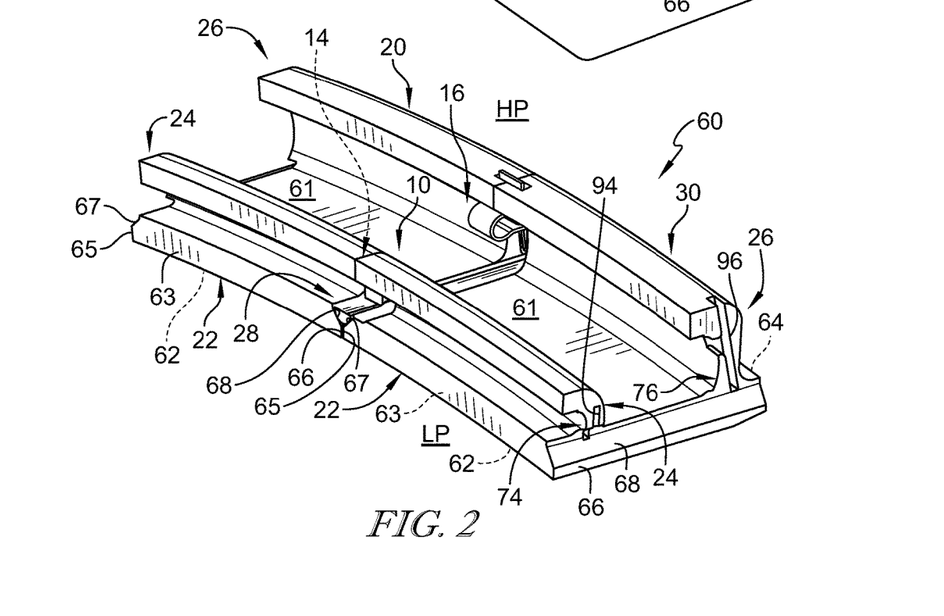
FIG. 2 is a perspective view of the gas turbine engine assembly from FIG. 1 assembled to show that the seal assembly is received in a channel formed between the first blade track component and the second blade track component along radially-outwardly facing surfaces of the first blade track component and the second blade track component.

A seal assembly 10 is adapted to close a channel 28 between first and second adjacent components 20, 30 in a gas turbine engine assembly 60 as shown in FIGS. 1 and 2. The gas turbine engine assembly 60 separates a high pressure zone HP from a low pressure zone LP within a gas turbine engine (not shown). The seal assembly 10 is arranged in a channel 28 formed by the adjacent components 20, 30 that opens toward the high pressure zone HP to block gasses from passing through the channel 28 between the high pressure zone HP and the low pressure zone LP during use of the gas turbine engine assembly 60.

In the illustrative embodiment, the components 20, 30 are blade track segments 20, 30 made from ceramic matrix materials that may be used with other blade track segments to provide a ring that extends around a central axis of the gas turbine engine assembly 60. The ring is arranged around rotating turbine wheels used in the gas turbine engine to form a gas path for directing gases through the gas turbine engine. When assembled, the first component 20 and the second component 30 are arranged adjacent to one another so that a right side surface 66 of the first component 20 is in confronting relation with a left side surface 65 of the second component 30 as shown in FIG. 2. A right chamfer surface 68 of the first component 20 cooperates with a left chamfer surface 67 of the second component 30 to create the channel 28 opening toward the high pressure zone HP that receives the seal assembly 10 as shown in FIGS. 2 and 3.

Figure 3:
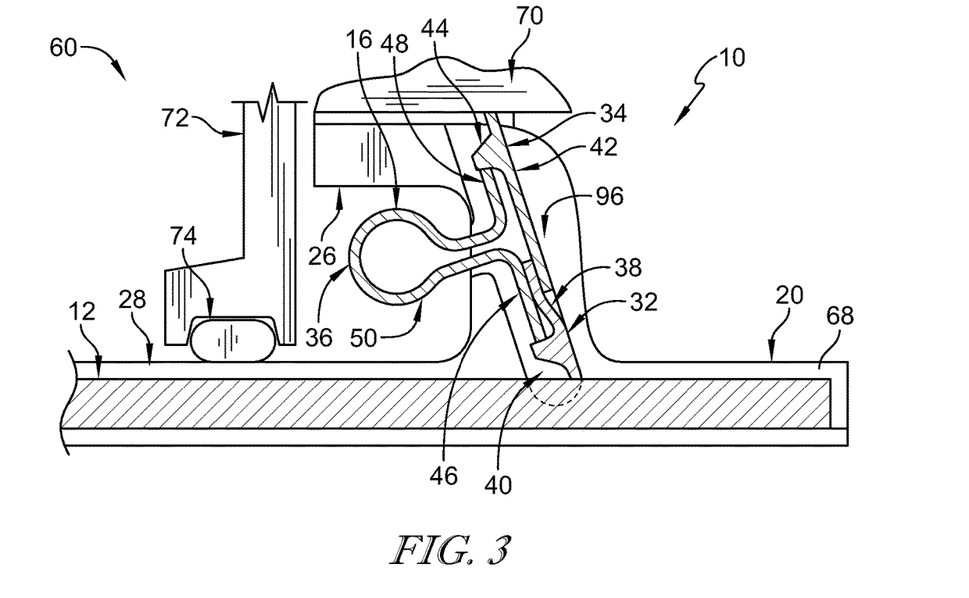
FIG. 3 is a cross sectional view of FIG. 2 showing that the biaser seal is configured to push the rod seal of the seal assembly into contact with the blade track components and showing that the biaser seal includes an inner strip seal, an outer strip seal, and a bias member that pushes the inner strip seal and the outer strip seal into position contacting adjacent blade track components.

The seal assembly 10 includes a rod seal 12, an axial-locator seal 14, and a biaser seal 16 as shown in FIGS. 1-3. The rod seal 12 is located in the channel 28 to block gasses from passing through the channel 28 between the high pressure zone HP and the low pressure zone LP during use of the gas turbine engine assembly 60. The axial-locator seal 14 engages the components 20, 30 and the rod seal 12 to axial locate the rod seal 12 relative to the components 20, 30. The biaser seal 16 pushes the rod seal 12 radially inward into engagement with the components 20, 30 so that the rod seal 12 remains engaged with the components 20, 30.

The biaser seal 16 includes an inner strip seal 32, an outer strip seal 34, and a biaser 36 as shown in FIG. 3. Illustratively, the inner strip seal 32 engages the rod seal 12 and the outer strip seal 34 engages the ground component 70. The biaser 36 is configured to force the inner strip seal 32 away from the outer strip seal 34 to cause the inner strip seal 32 to push the rod seal 12 into engagement with the components 20, 30 while allowing for relative growth between the first component 20, the second component 30, and the ground component 70.

As one example, if the first component 20 and the second component 30 move apart from the ground component 70, the force of the biaser 36 causes the inner strip seal 32 to move away from the outer strip seal 34. As a result, the inner strip seal 32 continues to push the rod seal 12 into engagement with the components 20, 30. As another example, if the components 20, 30 move toward the ground component 70, the inner strip seal 32 will overcome the bias force of the biaser 36 and move toward the outer strip seal 34 while still pushing the rod seal 12 into engagement with the components 20, 30.

Each of the components 20, 30 are substantially similar and each includes a panel 22, a first hanger 24, and a second hanger 26 as shown in FIGS. 1 and 2. The first hanger 24 and the second hanger 26 are sometimes referred to as attachment features. The panel 22 separates the high pressure zone HP from the low pressure zone LP. The first hanger 24 and the second hanger 26 are configured to be coupled to structure surrounding the gas turbine engine assembly 60 such as, for example, the ground component 70 as shown in FIG. 3.

Each panel 22 of the components 20, 30 is illustratively formed to include a high pressure surface 61 and a low pressure surface 62 as shown in FIG. 2. The high pressure surface 61 faces the high pressure zone HP and the low pressure surface 62 is opposite the high pressure surface 61 and faces the low pressure zone LP. Each panel 22 is also formed to include a forward surface 63, an aft surface 64, the left side surface 65, and the right side surface 66 as shown in FIGS. 1 and 2.

Additionally, in the illustrative embodiment, each panel 22 is formed to include the left chamfer surface 67 and the right chamfer surface 68 as shown in FIG. 1. The left chamfer surface 67 extends at an angle generally from the high pressure surface 61 to the left side surface 65 of the panel 22. The right chamfer surface 68 extends at an angle generally from the high pressure surface 61 to the right side surface 66 of the panel 22. The left chamfer surface 67 and the right chamfer surface 68 may be generally flat or barreled (curved).

The left chamfer surface 67 and the right chamfer surface 68 extend along the corresponding left side surface 65 and the right side surface 66 from the forward surface 63 to the aft surface 64 as shown in FIG. 1. Accordingly, the channel 28 extends from the forward surface 63 to the aft surface 64 of the panels 22 included in the first component 20 and the second component 30. The channel 28 is illustratively shaped with straight sides forming a generally triangular space for the seal assembly 10, but may have curved or otherwise shaped sides that provide a space for the seal assembly 10.

The first hanger 24 and the second hanger 26 are integral with the panels 22 of the first and the second components 20, 30 and are adapted for coupling the panels 22 of the first and the second component 20, 30 with structure surrounding the gas turbine engine assembly 60 as suggested in FIGS. 1 and 2. In the illustrative embodiment, the first hanger 24 and the second hanger 26 have a generally L-shape adapted to hang from brackets in a support structure. In other embodiments, the first and the second hangers may be dovetail shaped, may have pin-receiving holes, or have any other suitable shape for coupling the gas turbine engine assembly 60 with other structures.

Each of the first hangers 24 is formed to include a slot 94 sized to receive the axial-locator seal 14 as shown in FIGS. 1 and 2. The slots 94 of adjacent components 20, 30 cooperate to receive the axial-locator seal 14. Each of the second hangers 26 is formed to include a slot 96 sized to receive at least a portion of the biaser seal 16 as shown in FIGS. 1 and 2. The slots 96 of adjacent components 20, 30 cooperate to receive the biaser seal 16.

In some embodiments, the components 20, 30 are made from materials other than ceramic matrix composite materials. In other embodiments, the components 20, 30 are adapted for use as combustor tiles included in the combustor of a gas turbine engine or as heat shields included in other sections of a gas turbine engine.

Figure 4:
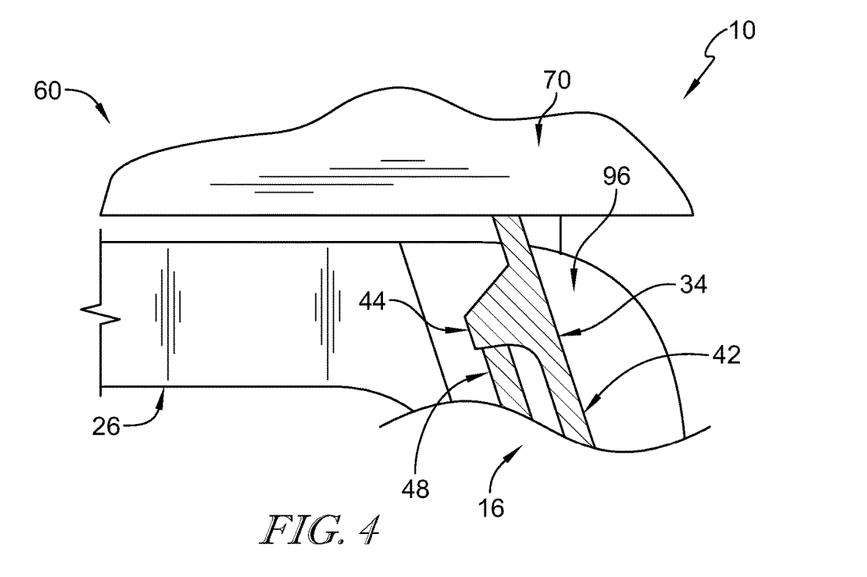
FIG. 4 is detail view of a portion of FIG. 3 showing that the outer strip seal includes a seal strip and a step integral with the seal strip that extends from the seal strip to be engaged by the bias member.

Illustratively, the gas turbine engine assembly 60 further includes the ground component 70 as shown in FIGS. 3 and 4. The ground component 70 is arranged adjacent to the second hangers 26 of the first and second components 20, 30 opposite the panels 22. Specifically, the ground component 70 is located radially around and outside of the second hangers 26. The gas turbine engine assembly 60 may further include a locator flange 72 and a seal 74 as shown in FIG. 3.

The seal assembly 10 is arranged in the channel 28 formed by the left chamfer surface 67 and the right chamfer surface 68 when the first component 20 is arranged in confronting relation to the second component 30. The seal assembly 10 illustratively includes the rod seal 12, the biaser seal 16, and the axial-locator seal 14 as shown in FIG. 1. The rod seal 12 is arranged in the channel 28 and is pushed into contact with the first and second components 20, 30 by the biaser seal 16 to block gasses from passing through the channel 28 formed between the first and the second components 20, 30. The axial-locator seal 14 is configured to block axial movement of the rod seal 12 in the channel 28.

The rod seal 12 is illustratively sized to extend from the forward surface 63 to the aft surface 64 of the panels 22 included in the first and the second components 20, 30 as shown in FIGS. 1 and 2. In the illustrative embodiment, the rod seal 12 is formed to include a notch 84 as shown in FIG. 1. The notch 84 receives a portion of the axial-locator seal 14 so that the rod seal 12 is axially located by the axial-locator seal 14.

In other embodiments, any number of notches may be formed in the rod seal 12. The notch 84 illustratively extends most the way around the rod seal 12 as shown in FIG. 1. In some embodiments, the notch 84 may extend fully around the rod seal 12. In some embodiments, no notches are formed in the rod seal 12 as different locating features may be included in the components 20, 30.

In the illustrative embodiment, the rod seal 12 has a semicircular cross sectional profile. In other embodiments, the rod seal 12 may have a round cross sectional profile, a circular cross sectional profile, an elliptical cross sectional profile, or a polygonal cross sectional profile. The rod seal 12 illustratively comprises ceramic matrix composite materials. In other embodiments, the rod seal 12 comprises ceramic monolithic materials, metallic materials, or other suitable materials.

When the gas turbine engine is not operating, there is no high pressure zone HP pushing the rod seal 12 into place. The biaser seal 16 pushes the rod seal 12 radially inwardly while the gas turbine engine is not operating so that the rod seal 12 maintains contact with the components 20, 30. During use of the gas turbine engine, the pressure in the high pressure zone may cooperate with the biaser seal 16 to help push the rod seal 12 into contact with the components 20, 30. The biaser seal 16 is illustratively made up of a number of components as shown in FIGS. 1-4, but can also be made up of a single component as shown in other embodiments of the present disclosure.

The biaser seal 16 includes an inner strip seal 32, an outer strip seal 34, and a biaser 36 as shown in FIG. 3. The inner strip seal 32 is arranged in the slots 96 formed in the second hangers 26 of the components 20, 30 and engages the rod seal 12. The outer strip seal 34 is arranged in the slots 96 and engages the ground component 70. The biaser 36 is arranged, at least in part, in the slots 96 formed in the second hangers 26 and is configured to push the inner strip seal 32 toward the rod seal 12.

The inner strip seal 32 includes a seal strip 38 and a step 40 that extends from the seal strip 38 as shown in FIG. 3. During use, the biaser 36 engages the step 40 of the inner strip seal 32 to bias the inner strip seal 32 radially inwardly and push the inner strip seal 32 toward the rod seal 12. In the illustrative embodiment, the step 40 is integral to the seal strip 38 such that the inner strip seal 32 is a monolithic component. In other embodiments, the step 40 is coupled to the seal strip 38 such as, for example, with braze. In the illustrative embodiment, the seal strip 38 is joggled (sometimes called bent) axially forward such that a portion of the seal strip 38 extends axially forward and radially outward from the step 40 relative to another portion of the seal strip 38.

The outer strip seal 34 overlaps the inner strip seal 32 within the slots 96 formed in the components 20, 30 as shown in FIG. 3. The outer strip seal 34 includes a seal strip 42 and a step 44 that extends from the seal strip 42 as shown in FIG. 3. The biaser 36 engages the step 44 of the outer strip seal 34 to bias the outer strip seal 34 radially outward and push the outer strip seal 34 toward the ground component 70. In the illustrative embodiment, the step 44 is integral to the seal strip 42 such that the outer strip seal 34 is a monolithic component. In other embodiments, the step 44 is coupled to the seal strip 42.

The biaser 36 comprises a bent strip of single-thickness material formed to include an inner pusher portion 46, an outer pusher portion 48, and a spring portion 50 as shown in FIG. 3. In other embodiments, the biaser 36 is formed from a plurality of components. The inner pusher portion 46 is located in the slots 96 and is arranged to engage the inner strip seal 32. The outer pusher portion 48 is located in the slots 96 and is arranged to engage the outer strip seal 34. The spring portion 50 interconnects the inner pusher portion 46 and the outer pusher portion 48.

The spring portion 50 is shaped to bias the inner pusher portion 46 away from the outer pusher portion 48 as shown in FIG. 3. Illustratively, the inner pusher portion 46 and the outer pusher portion 48 are pushed together to compress the spring portion 50 during assembly. After the biaser seal 16 is assembled, the spring portion 50 provides an opposing force that causes the inner pusher portion 46 and the outer pusher portion 48 to push the inner strip seal 32 and the outer strip seal 34 apart toward the components 20, 30 and the ground component 70 respectively. The spring portion 50 causes the inner pusher portion to push the rod seal 12 into engagement while allowing for growth between the components 20, 30 and the ground component 70.

The spring portion 50 may be shaped in a number of ways to bias the inner pusher portion 46 away from the outer pusher portion 48 as suggested in FIGS. 3, 5, 7, 8, 9, 11, 15, 16, and 21. In the illustrative embodiment, the spring portion 50 is arranged outside the slots 96 formed in the second hangers 26 of the components 20, 30. In other embodiments, the spring portion 50 is arranged inside the slots 96 formed in the second hangers 26 of the components 20, 30.

The axial-locator seal 14 extends into the first component 20 and the second component 30 and over the channel 28 to block movement of the rod seal 12 out of the channel 28 as suggested in FIGS. 1 and 2. The axial-locator seal 14 extends out from slots 94 formed in the first component 20 and the second component 30. The slots 94 are illustratively formed in the first hanger 24 and the panel 22 included in each of the first and the second components 20, 30.

The axial-locator seal 14 is formed to include a cutout 15 that receives a necked down portion of the rod seal 12 at the notch 84. The axial-locator seal 14 comprises metallic materials but may comprise ceramic-containing materials or other suitable materials. Illustratively, the axial-locator seal 14 is formed from a material having a generally constant thickness as shown in FIG. 1.

Figure 5:
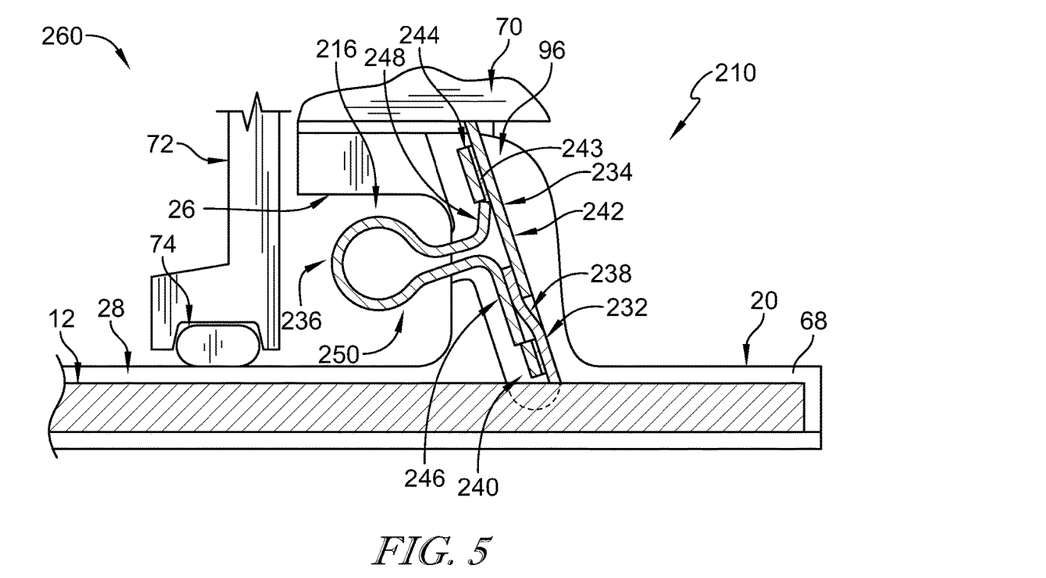
FIG. 5 is a cross sectional view of another gas turbine engine assembly with a second biaser seal showing that the second biaser seal is configured to push the rod seal of the seal assembly into contact with the blade track components and showing that the biaser seal includes an inner strip seal, an outer strip seal, and a bias member that pushes the inner strip seal and the outer strip seal into position contacting adjacent components.
Figure 6:
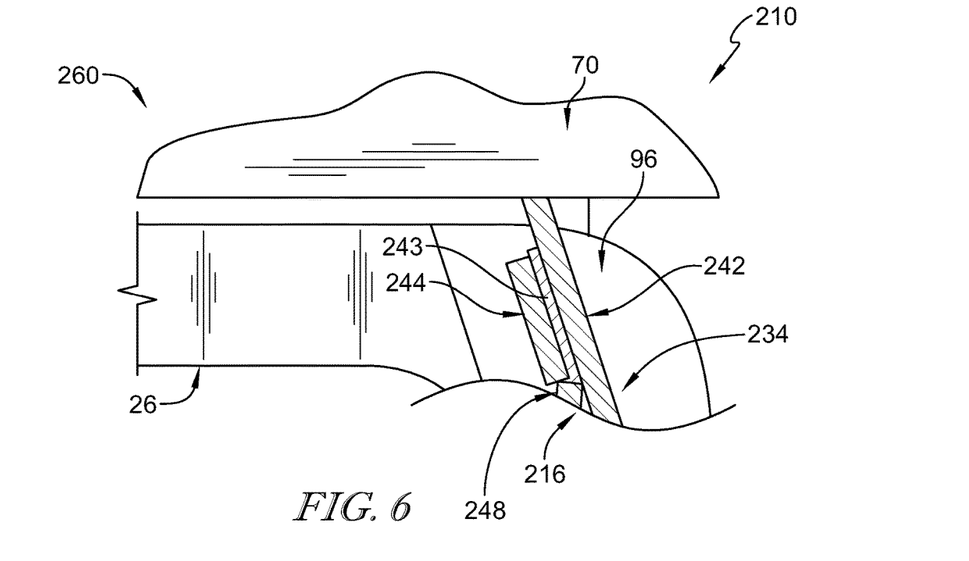
FIG. 6 is detail view of a portion of FIG. 5 showing that the outer strip seal includes a seal strip and a step bonded to the seal strip that extends from the seal strip to be engaged by the bias member.

Another embodiment of a seal assembly 210 for use in a gas turbine engine assembly 260 is shown in FIGS. 5 and 6. The seal assembly 210 is substantially similar to the seal assembly 10 shown in FIGS. 1-4 and described herein. Accordingly, similar reference numbers in the 200 series indicate features that are common between the seal assembly 10 and the seal assembly 210. The description of the seal assembly 10 is incorporated by reference to apply to the seal assembly 210, except in instances when it conflicts with the specific description and the drawings of the seal assembly 210.

The seal assembly 210 includes the rod seal 12, the axial-locator seal 14, and a biaser seal 216. The biaser seal 216 includes an inner strip seal 232, an outer strip seal 234, and a biaser 236 as shown in FIG. 5.

The inner strip seal 232 of the seal assembly 210 includes a seal strip 238 and a step end 240 that extends from the seal strip 238 as shown in FIG. 5. The biaser 236 engages the step end 240 of the inner strip seal 232 to bias the inner strip seal 232 radially inward and push the inner strip seal 232 toward the rod seal 12. In the illustrative embodiment, the step end 240 is brazed to the seal strip 238. In the illustrative embodiment, the seal strip 238 is joggled axially forward.

The outer strip seal 234 overlaps the inner strip seal 232 within the slots 96 formed in the components 20, 30 as shown in FIG. 5. The outer strip seal 234 includes a seal strip 242 and a step 244 that extends from the seal strip 242 as shown in FIG. 6. In the illustrative embodiment, the step 244 is brazed to the seal strip 242 with braze 243. The biaser 236 engages the step 244 of the outer strip seal 234 to bias the outer strip seal 234 radially outward and push the outer strip seal 234 toward the ground component 70.

The biaser 236 comprises a bent strip of single-thickness material formed to include the inner pusher portion 246, an outer pusher portion 248, and the spring portion 250 as shown in FIG. 5. Illustratively, the outer pusher portion 248 and the inner pusher portion 246 are relatively shorter than the outer pusher portion 48 and the inner pusher portion 46 of the seal assembly 10. The spring portion 250 interconnects the inner pusher portion 246 and the outer pusher portion 248.

Figure 7:
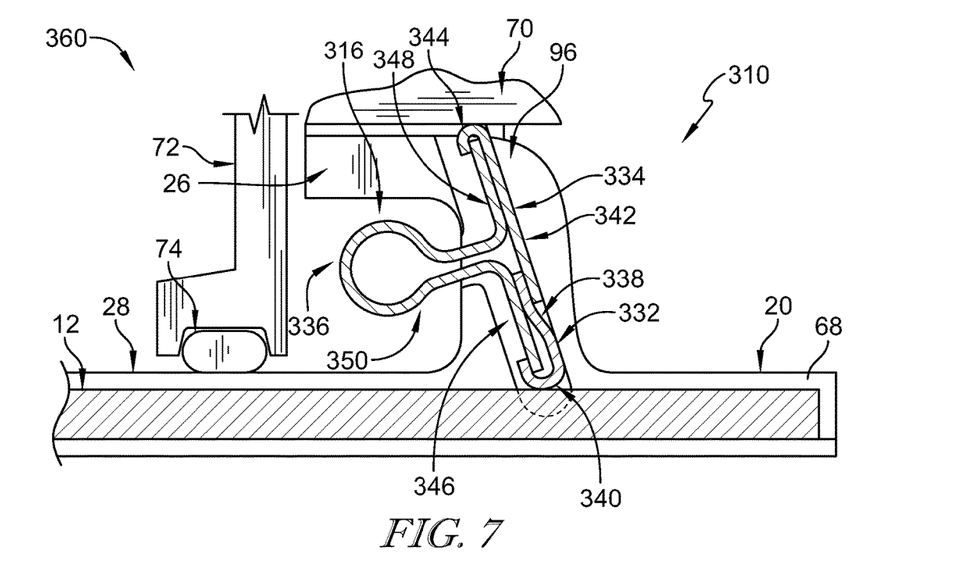
FIG. 7 is a cross sectional view of another gas turbine engine assembly with a third biaser seal showing that the third biaser seal is configured to push the rod seal of the seal assembly into contact with the blade track components.

Another embodiment of a seal assembly 310 for use in a gas turbine engine assembly 360 is shown in FIG. 7. The seal assembly 310 is substantially similar to the seal assembly 10 shown in FIGS. 1-4 and described herein. Accordingly, similar reference numbers in the 300 series indicate features that are common between the seal assembly 10 and the seal assembly 310. The description of the seal assembly 10 is incorporated by reference to apply to the seal assembly 310, except in instances when it conflicts with the specific description and the drawings of the seal assembly 310.

The seal assembly 310 includes the rod seal 12, the axial-locator seal 14, and a biaser seal 316. The biaser seal 316 includes an inner strip seal 332, an outer strip seal 334, and a biaser 336 as shown in FIG. 7.

The inner strip seal 332 of the seal assembly 310 includes a seal strip 338 and a hook end 340 that extends from the seal strip 338 as shown in FIG. 7. An inner pusher portion 346 of the biaser 336 is received in the hook end 340 to couple the biaser 336 with the inner strip seal 332. The biaser 336 engages the hook end 340 of the inner strip seal 332 to bias the inner strip seal 332 radially inward and push the inner strip seal 332 toward the rod seal 12. In the illustrative embodiment, the hook end 340 is integral to the seal strip 338 such that the inner strip seal 332 is a monolithic component. In other embodiments, the hook end 340 is coupled to the seal strip 338 such as, for example, with braze. In the illustrative embodiment, the seal strip 338 is joggled axially forward.

The outer strip seal 334 overlaps the inner strip seal 332 within the slots 96 formed in the first component 20 and the second component 30 as shown in FIG. 7. The outer strip seal 334 includes a seal strip 342 and a hook end 344 that extends from the seal strip 342 as shown in FIG. 7. The biaser 336 engages the hook end 344 of the outer strip seal 334 to bias the outer strip seal 334 radially outward and push the outer strip seal 334 toward the ground component 70.

The biaser 336 comprises a bent strip of single-thickness material formed to include an inner pusher portion 346, an outer pusher portion 348, and the spring portion 50 as shown in FIG. 7. Illustratively, the outer pusher portion 348 and the inner pusher portion 346 are relatively longer than the outer pusher portion 48 and the inner pusher portion 46 of the seal assembly 10. The spring portion 50 interconnects the inner pusher portion 346 and the outer pusher portion 348.

Figure 8:
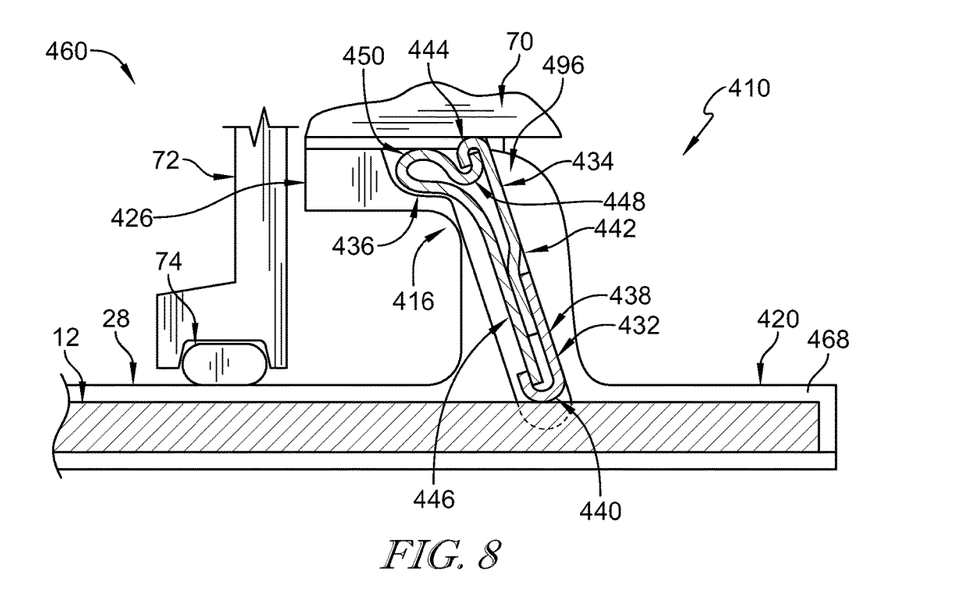
FIG. 8 is a cross sectional view of another gas turbine engine assembly with a fourth biaser seal showing that the fourth biaser seal is configured to push the rod seal of the seal assembly into contact with the blade track components.

Another embodiment of a seal assembly 410 for use in a gas turbine engine assembly 460 is shown in FIG. 8. The seal assembly 410 is substantially similar to the seal assembly 10 shown in FIGS. 1-4 and described herein. Accordingly, similar reference numbers in the 400 series indicate features that are common between the seal assembly 10 and the seal assembly 410. The description of the seal assembly 10 is incorporated by reference to apply to the seal assembly 410, except in instances when it conflicts with the specific description and the drawings of the seal assembly 410.

The seal assembly 410 includes the rod seal 12, the axial-locator seal 14, and a biaser seal 416. The biaser seal 416 includes an inner strip seal 432, an outer strip seal 434, and a biaser 436 as shown in FIG. 8. The seal assembly 410 further includes a component 420 formed to define a slot 496 shaped to receive the biaser seal 416 as shown in FIG. 8.

The inner strip seal 432 overlaps the outer strip seal 434 within the slots 496 formed in the first component 420 and the second component 430 as shown in FIG. 8. The inner strip seal 432 of the seal assembly 410 includes a seal strip 438 and a hook end 440 that extends from the seal strip 438 as shown in FIG. 8. An inner pusher portion 446 of the biaser 436 is received in the hook end 440 to couple the biaser 436 with the inner strip seal 432. The biaser 436 engages the hook end 440 of the inner strip seal 432 to bias the inner strip seal 432 radially inward and push the inner strip seal 432 toward the rod seal 12.

In the illustrative embodiment, the hook end 440 is integral to the seal strip 438 such that the inner strip seal 432 is a monolithic component. In other embodiments, the hook end 440 is coupled to the seal strip 438 such as, for example, with braze. In the illustrative embodiment, the seal strip 438 is formed without a joggle.

The outer strip seal 434 includes a seal strip 442 and a hook end 444 that extends from the seal strip 442. The biaser 436 engages the hook end 444 of the outer strip seal 434 to bias the outer strip seal 434 radially outward and push the outer strip seal 434 toward the ground component 70.

The biaser 436 comprises a bent strip of single-thickness material formed to include an inner pusher portion 446, an outer pusher portion 448, and the spring portion 450 as shown in FIG. 8. Illustratively, the outer pusher portion 448 is relatively shorter than the outer pusher portion 48 of the seal assembly 10 and the inner pusher portion 446 is relatively longer than the inner pusher portion 46 of the seal assembly 10. The spring portion 450 interconnects the inner pusher portion 446 and the outer pusher portion 448.

As shown in FIG. 8, the spring portion 450 is located radially outward toward the hook end 444 of the outer strip seal 434 and the ground component 70. The spring portion 450 is shaped to have a relatively smaller radial height when compared to the spring portion 50.

Figure 9:
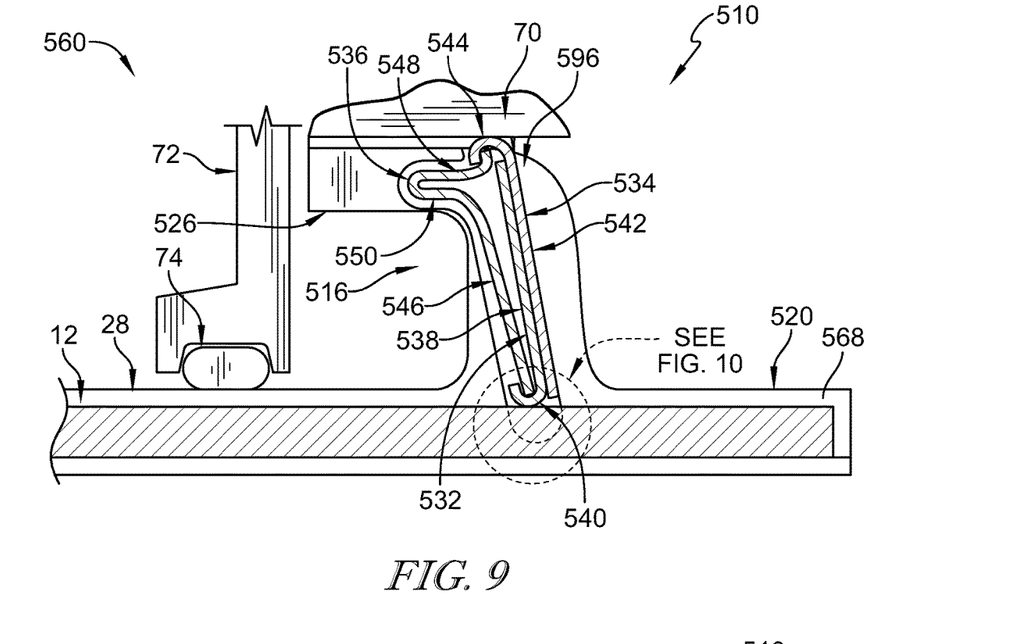
FIG. 9 is a cross sectional view of another gas turbine engine assembly with a fifth biaser seal showing that the fifth biaser seal is configured to push the rod seal of the seal assembly into contact with the blade track components and showing that the biaser seal includes an inner strip seal, an outer strip seal, and a bias member that pushes the inner strip seal and the outer strip seal into position contacting adjacent components.
Figure 10:
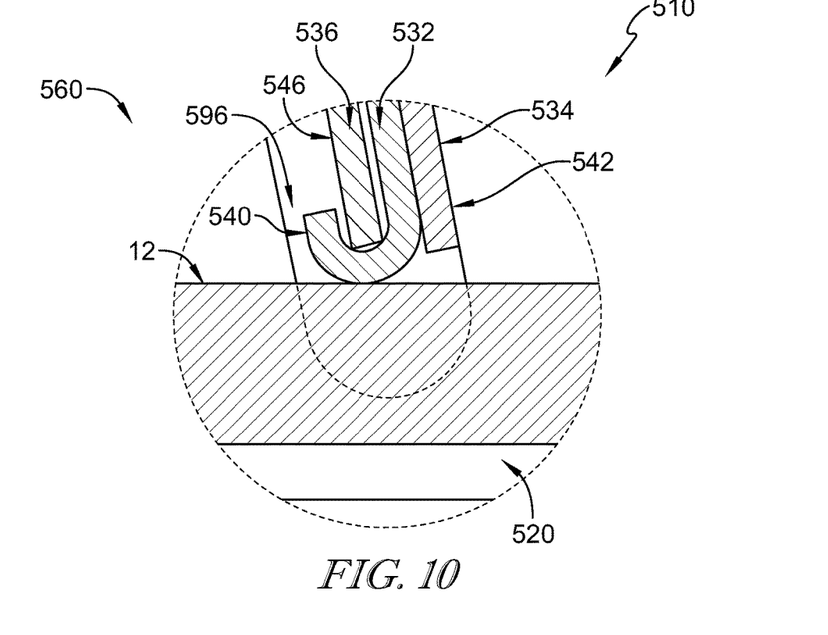
FIG. 10 is detail view of a portion of FIG. 9 showing that the inner strip seal of the biaser seal includes a hook engaged by the bias member to push the inner strip seal into the rod seal.

Another embodiment of a seal assembly 510 for use in a gas turbine engine assembly 560 is shown in FIGS. 9 and 10. The seal assembly 510 is substantially similar to the seal assembly 10 shown in FIGS. 1-4 and described herein. Accordingly, similar reference numbers in the 500 series indicate features that are common between the seal assembly 10 and the seal assembly 510. The description of the seal assembly 10 is incorporated by reference to apply to the seal assembly 510, except in instances when it conflicts with the specific description and the drawings of the seal assembly 510.

The seal assembly 510 includes the rod seal 12, the axial-locator seal 14, and a biaser seal 516. The biaser seal 516 includes an inner strip seal 532, an outer strip seal 534, and a biaser 536 as shown in FIGS. 9 and 10. The seal assembly 510 further includes a component 520 formed to define a slot 596 shaped to receive the biaser seal 516 as shown in FIG. 9.

The inner strip seal 532 of the seal assembly 510 includes a seal strip 538 and a hook end 540 that extends from the seal strip 538 as shown in FIG. 9. An inner pusher portion 546 of the biaser 536 is received in the hook end 540 to couple the biaser 536 with the inner strip seal 532. The biaser 536 engages the hook end 540 of the inner strip seal 532 and biases the inner strip seal 532 radially inward to push the inner strip seal 532 toward the rod seal 12.

In the illustrative embodiment, the hook end 540 is integral to the seal strip 538 such that the inner strip seal 532 is a monolithic component as shown in FIG. 10. In other embodiments, the hook end 540 is coupled to the seal strip 538 such as, for example, with braze. In the illustrative embodiment, the seal strip 538 is formed without a joggle. Illustratively, the inner strip seal 532 generally extends radially an entire length of the outer strip seal 534.

The outer strip seal 534 overlaps the inner strip seal 532 within the slots 596 formed in the first component 520 and the second component 530 as shown in FIG. 9. The outer strip seal 534 includes a seal strip 542 and a hook end 544 that extends from the seal strip 542. The biaser 536 engages the hook end 544 of the outer strip seal 534 and biases the outer strip seal 534 radially outward to push the outer strip seal 534 toward the ground component 70. In the illustrative embodiment, the seal strip 542 is formed without a joggle.

The biaser 536 comprises a bent strip of single-thickness material formed to include an inner pusher portion 546, an outer pusher portion 548, and the spring portion 550 as shown in FIGS. 9 and 10. Illustratively, the outer pusher portion 548 is relatively shorter than the outer pusher portion 48 of the seal assembly 10 and the inner pusher portion 546 is relatively longer than the inner pusher portion 46 of the seal assembly 10. The spring portion 550 interconnects the inner pusher portion 546 and the outer pusher portion 548.

As shown in FIG. 9, the spring portion 550 is located radially outward toward the hook end 544 of the outer strip seal 534 and the ground component 70. The spring portion 550 is shaped to have a relatively smaller radial height when compared to the spring portion 50.

Another embodiment of a seal assembly 610 for use in a gas turbine engine assembly 660 is shown in FIGS. 11-14. The seal assembly 610 is substantially similar to the seal assembly 10 shown in FIGS. 1-4 and described herein. Accordingly, similar reference numbers in the 600 series indicate features that are common between the seal assembly 10 and the seal assembly 610. The description of the seal assembly 10 is incorporated by reference to apply to the seal assembly 610, except in instances when it conflicts with the specific description and the drawings of the seal assembly 610.

Figure 11:
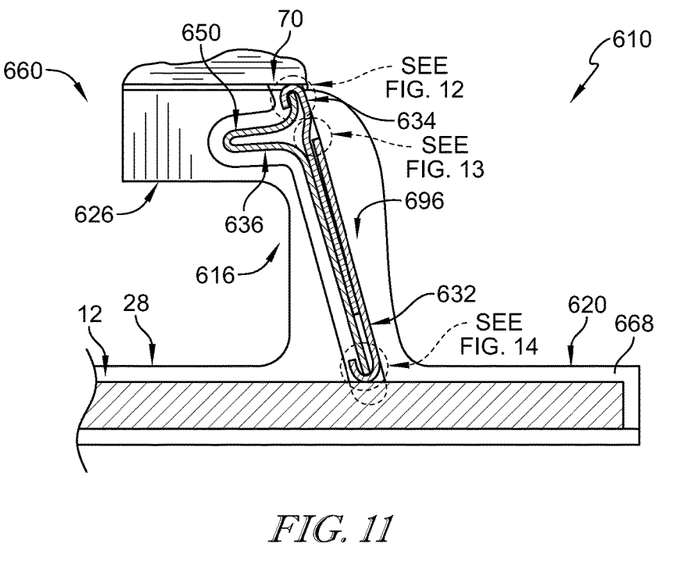
FIG. 11 is a cross sectional view of another gas turbine engine assembly with a sixth biaser seal showing that the sixth biaser seal is configured to push the rod seal of the seal assembly into contact with the blade track components and showing that the biaser seal includes an inner strip seal, an outer strip seal, and a bias member that pushes the inner strip seal and the outer strip seal into position contacting adjacent components.

The seal assembly 610 includes the rod seal 12, the axial-locator seal 14, and a biaser seal 616. The biaser seal 616 includes an inner strip seal 632, an outer strip seal 634, and a biaser 636 as shown in FIGS. 11-14. The seal assembly 610 further includes a component 620 formed to define a slot 696 shaped to receive the biaser seal 616 as shown in FIG. 11.

Figures 12, 13, 14:
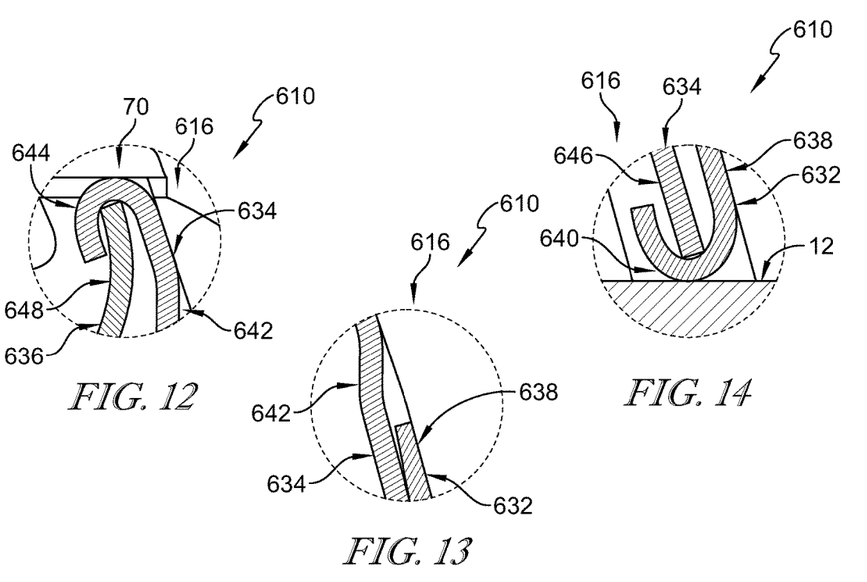
FIG. 12 is detail view of a portion of FIG. 11 showing that the outer strip seal includes a seal strip and a hook integral with the seal strip that extends from the seal strip to be engaged by the bias member.
FIG. 13 is detail view of a portion of FIG. 11 showing that the outer strip seal includes a joggle near the hook and that the inner strip seal extends radially toward the joggle.
FIG. 14 is detail view of a portion of FIG. 11 showing that the inner strip seal includes a seal strip and a hook integral with the seal strip that extends from the seal strip to be engaged by the bias member.

The inner strip seal 632 of the seal assembly 610 includes a seal strip 638 and a hook end 640 that extends from the seal strip 638 as shown in FIGS. 11 and 14. An inner pusher portion 646 of the biaser 636 is received in the hook end 640 to couple the biaser 636 with the inner strip seal 632. The biaser 636 engages the hook end 640 of the inner strip seal 632 and biases the inner strip seal 632 radially inward to push the inner strip seal 632 toward the rod seal 12.

In the illustrative embodiment, the hook end 640 is integral to the seal strip 638 such that the inner strip seal 632 is a monolithic component as shown in FIGS. 11 and 14. In other embodiments, the hook end 640 is coupled to the seal strip 638 such as, for example, with braze. In the illustrative embodiment, the seal strip 638 is formed without a joggle. Illustratively, the inner strip seal 632 generally extends radially an entire length of a seal strip 642 of the outer strip seal 634.

The outer strip seal 634 overlaps the inner strip seal 632 within the slots 696 formed in the first component 620 and the second component 630 as shown in FIG. 11. The outer strip seal 634 includes the seal strip 642 and a hook end 644 that extends from the seal strip 642. The biaser 636 engages the hook end 644 of the outer strip seal 634 and biases the outer strip seal 634 radially outward to push the outer strip seal 634 toward the ground component 70 as shown in FIGS. 11 and 12. In the illustrative embodiment, the seal strip 642 is formed to include a joggle as shown in FIG. 13.

The biaser 636 comprises a bent strip of single-thickness material formed to include an inner pusher portion 646, an outer pusher portion 648, and the spring portion 650 as shown in FIG. 11. Illustratively, the outer pusher portion 648 is relatively shorter than the outer pusher portion 48 of the seal assembly 10 and the inner pusher portion 646 is relatively longer than the inner pusher portion 46 of the seal assembly 10. The spring portion 650 interconnects the inner pusher portion 646 and the outer pusher portion 648.

As shown in FIG. 11, the spring portion 650 is located radially outward toward the hook end 644 of the outer strip seal 634 and the ground component 70. The spring portion 650 is shaped to have a relatively smaller radial height when compared to the spring portion 50.

Figures 15, 16:
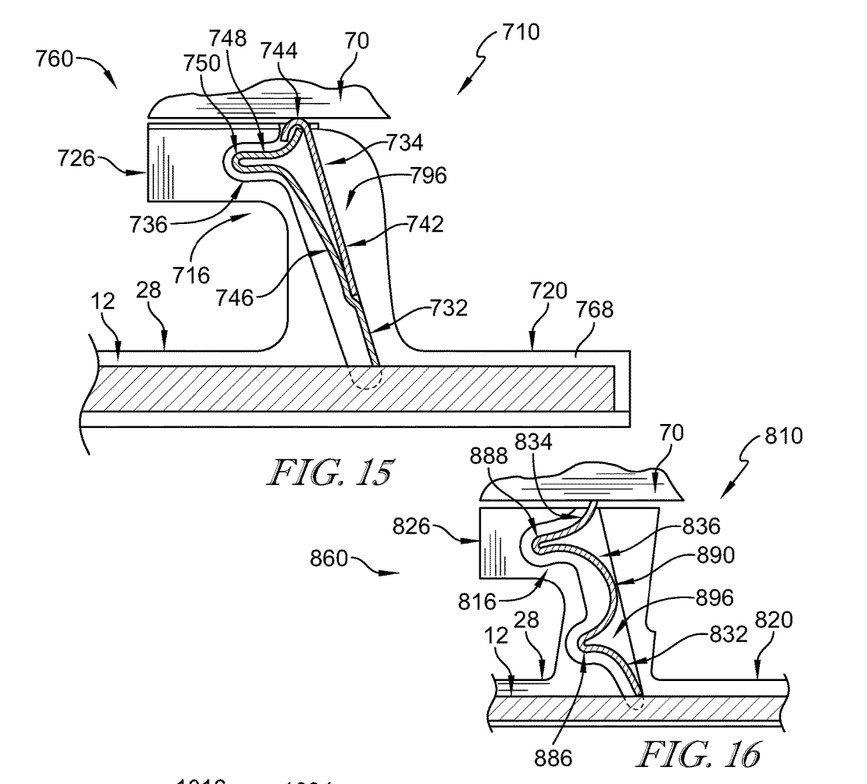
FIG. 15 is a cross sectional view of another gas turbine engine assembly with a seventh biaser seal showing that the seventh biaser seal is configured to push the rod seal of the seal assembly into contact with the blade track components and showing that the biaser seal includes an inner strip seal, an outer strip seal, and a bias member that is integral with the inner strip seal.
FIG. 16 is a cross sectional view of another gas turbine engine assembly with an eighth biaser seal showing that the eighth biaser seal is configured to push the rod seal of the seal assembly into contact with the blade track components and showing that the biaser seal includes an inner strip seal, an outer strip seal, and a bias member that is integral with the inner strip seal and the outer strip.

Another embodiment of a seal assembly 710 for use in a gas turbine engine assembly 760 is shown in FIG. 15. The seal assembly 710 is substantially similar to the seal assembly 10 shown in FIGS. 1-4 and described herein. Accordingly, similar reference numbers in the 700 series indicate features that are common between the seal assembly 10 and the seal assembly 710. The description of the seal assembly 10 is incorporated by reference to apply to the seal assembly 710, except in instances when it conflicts with the specific description and the drawings of the seal assembly 710.

The seal assembly 710 includes the rod seal 12, the axial-locator seal 14, and a biaser seal 716. The biaser seal 716 includes an inner strip seal 732, an outer strip seal 734, and a biaser 736 as shown in FIG. 15. The seal assembly 710 further includes a component 720 formed to define a slot 796 shaped to receive the biaser seal 716 as shown in FIG. 15.

The inner strip seal 732 of the seal assembly 710 is integral with the biaser 736 as shown in FIG. 15. The inner strip seal 732 is coupled to the biaser 736 at the joggled portion of the inner strip seal 732. The biaser 736 pushes the inner strip seal 732 radially inward toward the rod seal 12.

The outer strip seal 734 overlaps the biaser 736 within the slots 796 formed in the first component 720 and the second component 730 as shown in FIG. 15. The outer strip seal 734 includes a seal strip 742 and a hook end 744 that extends from the seal strip 742. The biaser 736 engages the hook end 744 of the outer strip seal 734 and biases the outer strip seal 734 radially outward to push the outer strip seal 734 toward the ground component 70 as shown in FIG. 15.

The biaser 736 comprises a bent strip of single-thickness material formed to include an inner pusher portion 746, an outer pusher portion 748, and the spring portion 750 as shown in FIG. 15. Illustratively, the outer pusher portion 748 is relatively shorter than the outer pusher portion 48 of the seal assembly 10 and the inner pusher portion 746 is relatively longer than the inner pusher portion 46 of the seal assembly 10. The spring portion 750 interconnects the inner pusher portion 746 and the outer pusher portion 748.

Another embodiment of a seal assembly 810 for use in a gas turbine engine assembly 860 is shown in FIG. 16. The seal assembly 810 is substantially similar to the seal assembly 10 shown in FIGS. 1-4 and described herein. Accordingly, similar reference numbers in the 800 series indicate features that are common between the seal assembly 10 and the seal assembly 810. The description of the seal assembly 10 is incorporated by reference to apply to the seal assembly 810, except in instances when it conflicts with the specific description and the drawings of the seal assembly 810.

The seal assembly 810 includes the rod seal 12, the axial-locator seal 14, and a biaser seal 816. The biaser seal 816 includes an inner strip seal 832, an outer strip seal 834, and a biaser 836 as shown in FIG. 16. Illustratively, the biaser 836, the inner seal strip 832, and the outer seal strip 834 are integrally formed. The seal assembly 810 further includes a component 820 formed to define a slot 896 shaped to receive the biaser seal 816 as shown in FIG. 16.

The biaser 836 comprises a bent strip of single-thickness material formed to include an inner pusher portion 886, an outer pusher portion 888, and a spring portion 890 that extends between and interconnects the inner pusher portion 886 and the outer pusher portion 888. The inner pusher portion 886 is coupled to the inner strip seal 832 and arranged to push the inner strip seal 832 radially inward toward the rod seal 12. The outer pusher portion 888 is coupled to the outer strip seal 834 and arranged to push the outer strip seal 834 radially outward toward the ground component 70. In the illustrative embodiment, the spring portion 890 is curved and configured to plastically deform to push the inner pusher portion 886 and the outer pusher portion 888 apart from one another.

Figures 17, 18:
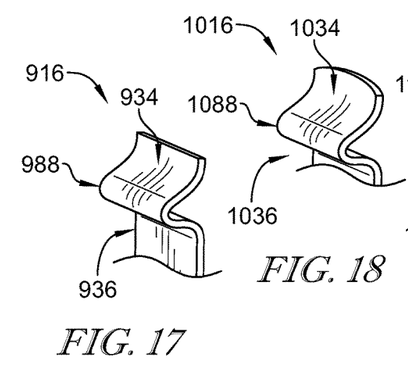
FIG. 17 is detail view of a portion of FIG. 16 showing a first embodiment of the outer strip seal in which the outer strip seal has an end with a relatively linear edge.
FIG. 18 is detail view of a portion of FIG. 16 showing a second embodiment of the outer strip seal in which the outer strip seal has an end with a curved edge.

Another embodiment of a biaser seal 916 for use in the gas turbine engine assembly 860 is shown in FIG. 17. The biaser seal 916 is substantially similar to the biaser seal 816 shown in FIG. 16 and described herein. Accordingly, similar reference numbers in the 900 series indicate features that are common between the biaser seal 816 and the biaser seal 916. The description of the biaser seal 816 is incorporated by reference to apply to the biaser seal 916, except in instances when it conflicts with the specific description and the drawings of the biaser seal 916.

The biaser seal 916 includes an inner strip seal 932, an outer strip seal 934, and a biaser 936. Illustratively, the biaser 936, the inner strip seal 932, and the outer strip seal 934 are integrally formed. The outer strip seal 934 is coupled to an outer pusher portion 988 of the biaser 936 as shown in FIG. 17. The outer strip seal 934 has an end configured to engage the ground component 70 and the end has a relatively linear edge. The inner strip seal 932 is substantially similar to the outer strip seal 934.

Another embodiment of a biaser seal 1016 for use in the gas turbine engine assembly 860 is shown in FIG. 18. The biaser seal 1016 is substantially similar to the biaser seal 816 shown in FIG. 16 and described herein. Accordingly, similar reference numbers in the 1000 series indicate features that are common between the biaser seal 816 and the biaser seal 1016. The description of the biaser seal 816 is incorporated by reference to apply to the biaser seal 1016, except in instances when it conflicts with the specific description and the drawings of the biaser seal 1016.

The biaser seal 1016 includes an inner strip seal 1032, an outer strip seal 1034, and a biaser 1036. Illustratively, the biaser 1036, the inner strip seal 1032, and the outer strip seal 1034 are integrally formed. The outer strip seal 1034 is coupled to an outer pusher portion 1088 of the biaser 1036 as shown in FIG. 18. The outer strip seal 1034 has an end configured to engage the ground component 70 and the end has a curved edge. The inner strip seal 1032 is substantially similar to the outer strip seal 1034.

Figures 19, 20:
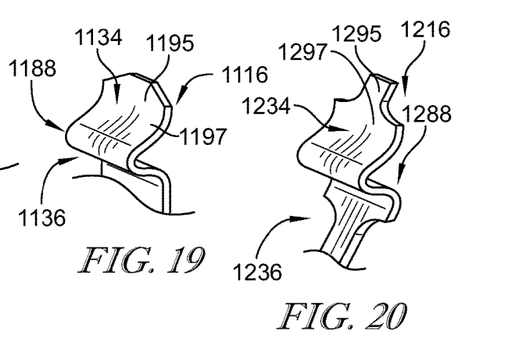
FIG. 19 is detail view of a portion of FIG. 16 showing a third embodiment of the outer strip seal in which the outer strip seal has an end with a plurality of angled edges.
FIG. 20 is detail view of a portion of FIG. 16 showing a fourth embodiment of the outer strip seal in which the outer strip seal has an end with a narrow portion and a wide portion.

Another embodiment of a biaser seal 1116 for use in the gas turbine engine assembly 860 is shown in FIG. 19. The biaser seal 1116 is substantially similar to the biaser seal 816 shown in FIG. 16 and described herein. Accordingly, similar reference numbers in the 1100 series indicate features that are common between the biaser seal 816 and the biaser seal 1116. The description of the biaser seal 816 is incorporated by reference to apply to the biaser seal 1116, except in instances when it conflicts with the specific description and the drawings of the biaser seal 1116.

The biaser seal 1116 includes an inner strip seal 1132, an outer strip seal 1134, and a biaser 1136. Illustratively, the biaser 1136, the inner strip seal 1132, and the outer strip seal 1134 are integrally formed. The outer strip seal 1134 is coupled to an outer pusher portion 1188 of the biaser 1136 as shown in FIG. 19. The outer strip seal 1134 has an end configured to engage the ground component 70 and the end has a plurality of linear edges. As shown in FIG. 19, the linear edges are angled relative to one another. The end has a narrow portion 1195 formed to include the angled edges and a wide portion 1197. As a result, the outer strip seal 1134 is narrower than the outer pusher portion 1188 of the biaser 1136. The inner strip seal 1132 is substantially similar to the outer strip seal 1134.

Another embodiment of a biaser seal 1216 for use in the gas turbine engine assembly 860 is shown in FIG. 20. The biaser seal 1216 is substantially similar to the biaser seal 816 shown in FIG. 16 and described herein. Accordingly, similar reference numbers in the 1200 series indicate features that are common between the biaser seal 816 and the biaser seal 1216. The description of the biaser seal 816 is incorporated by reference to apply to the biaser seal 1216, except in instances when it conflicts with the specific description and the drawings of the biaser seal 1216.

The biaser seal 1216 includes an inner strip seal 1232, an outer strip seal 1234, and a biaser 1236. Illustratively, the biaser 1236, the inner strip seal 1232, and the outer strip seal 1234 are integrally formed. The outer strip seal 1234 is coupled to an outer pusher portion 1288 of the biaser 1236 as shown in FIG. 20. The outer strip seal 1234 has an end configured to engage the ground component 70. As shown in FIG. 20, the end has a narrow portion 1295 arranged to engage the ground component 70 and a wide portion 1297 coupled to the outer pusher portion 1288. As a result, a portion of the outer strip seal 1234 is narrower than the outer pusher portion 1288 of the biaser 1236. The inner strip seal 1232 is substantially similar to the outer strip seal 1234. Illustratively, the spring portion 890 is narrower than the outer pusher portion 1288.

Figure 21:
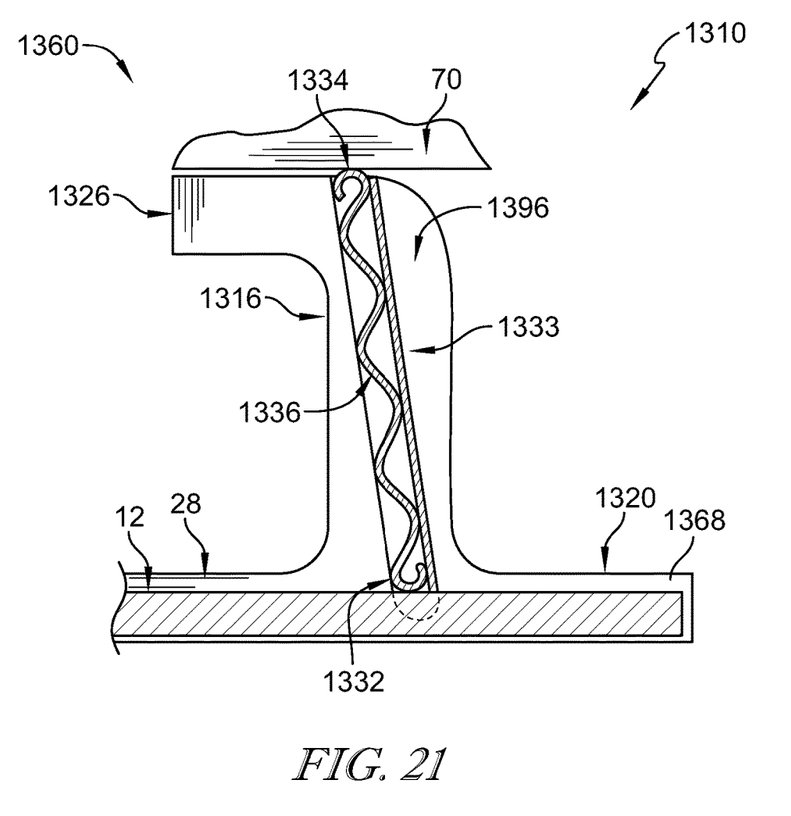
FIG. 21 is a cross sectional view of another gas turbine engine assembly with a biaser seal showing that the biaser seal is configured to push the rod seal of the seal assembly into contact with the blade track components and showing that the biaser seal includes an inner strip seal, an outer strip seal, a bias member that is integral with the inner strip seal and the outer strip, and a backer seal in contact with the bias member.

Another embodiment of a seal assembly 1310 for use in a gas turbine engine assembly 1360 is shown in FIG. 21. The seal assembly 1310 is substantially similar to the seal assembly 10 shown in FIGS. 1-4 and described herein. Accordingly, similar reference numbers in the 1300 series indicate features that are common between the seal assembly 10 and the seal assembly 1310. The description of the seal assembly 10 is incorporated by reference to apply to the seal assembly 1310, except in instances when it conflicts with the specific description and the drawings of the seal assembly 1310.

The seal assembly 1310 includes the rod seal 12, the axial-locator seal 14, and a biaser seal 1316. The biaser seal 1316 includes an inner strip seal 1332, an outer strip seal 1334, a biaser 1336, and a backer seal 1333 as shown in FIG. 21. Illustratively, the biaser 1336, the inner strip seal 1332, and the outer strip seal 1334 are integrally formed. The seal assembly 1310 further includes a component 1320 formed to define a slot 1396 shaped to receive the biaser seal 1316 as shown in FIG. 21.

The biaser 1336 comprises a bent strip of single-thickness material formed to include a plurality of undulations as shown in FIG. 21. The undulations allow the biaser 1336 to compress and push the inner strip seal 1332 and the outer strip seal 1334 apart to cause the rod seal 12 to engage the components 1320, 1330. Illustratively, the inner strip seal 1332 and the outer strip seal 1334 include hook ends. The backer seal 1333 overlaps the biaser 1336 and extends generally a height of the biaser 1336.

Typical ceramic matrix composite high pressure seal segment designs do not minimize leakage flows between components, particularly at the rod seal to strip seal interfaces. The present disclosure provides a seal assembly configured to significantly reduce the leakage area in this region.

Typical ceramic matrix composite high pressure seal segments use rod seals instead of strip seals along the flowpath between ceramic matrix composite high pressure seal segments. Typical rod seals may exacerbate an existing problem with strip seal arrangements such as, for example, the leakage area at the interface between the flowpath strip seal and vertical (radial) strip seals. The present disclosure further provides a method for significantly reducing this leakage area and may be applied to seal segment designs with either rod seals or strip seals along the flowpath.

The present disclosure may eliminate gaps at both ends of the strip seal. As a result, it may reduce the leakages at the rod seal end of a strip seal and may also reduce leakages at the opposite end of the strip seal. Thus, the present disclosure may be applied to a typical strip seal as well. The present disclosure may be applied at least anyplace in a turbine engine in which strip seals interface with strip seals, other seals, or mating components in a similar way.

In some embodiments, the seal assembly of the present disclosure may positively locate the rod seals in the engine when not operating. In this manner, the rod seals may be located adequately to generate enough pressure to pressure load them in place during operation. Without positive location, seals located "upside down" at the top or bottom of the engine may not generate enough internal pressure to seat the rod seal and provide sealing at the startup of the engine.

In some embodiments, the present disclosure may apply to back side strip seals along the flowpath as well as it does to rod seals. In some embodiments, an alternative concept to the rod seal would include a strip seal sitting on the back side of the flowpath. Such a design may avoid the manufacturing and thermal gradients associated with a strip seal slot along the flowpath edge in a ceramic matrix composite seal segment, similar to the rod seal. The present disclosure may apply to a backside strip seal, reducing/eliminating the leakage areas at the ends while also applying a bias load to the strip seal to locate it prior to start up so that pressure can be built up initially, enabling the strip seal to be held in place by pressure loading during operation.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine assembly, the assembly comprising
   a first component comprising ceramic matrix materials, the first component including a first panel formed to include a first chamfer surface and a first attachment feature that extends from the first panel to mount the first panel relative to other components within the gas turbine engine assembly,
   a second component comprising ceramic matrix materials, the second component including a second panel formed to include a second chamfer surface and a second attachment feature that extends from the second panel to mount the second panel relative to other components within the gas turbine engine assembly, and
   a seal assembly arranged in a channel formed by the first chamfer and the second chamfer when the first component is arranged in confronting relation to the second component, the seal assembly including a rod seal configured to block gasses from passing through the channel and a biaser seal configured to block gasses from passing through an interface between the first attachment feature and the second attachment feature, wherein the biaser seal is engaged with the rod seal and is configured to push the rod seal toward engagement with the first panel and the second panel,
   wherein the biaser seal includes (i) an inner strip seal arranged in slots formed in the first attachment feature and the second attachment feature that engages the rod seal and (ii) a biaser arranged, at least in part, in the slots formed in the first attachment feature and the second attachment feature, and the biaser is configured to push the inner strip seal toward the rod seal.

2. The gas turbine engine assembly of claim 1, wherein the inner strip seal includes a seal strip and a step that extends from the seal strip, and the biaser engages the step of the inner strip seal.

3. The gas turbine engine assembly of claim 2, wherein the step is one of integral to and brazed to the seal strip.

4. The gas turbine engine assembly of claim 1, wherein the inner strip seal includes a seal strip and a hook end, and the biaser engages the hook end of the inner strip seal.

5. The gas turbine engine assembly of claim 1, further comprising a ground component arranged adjacent to the first attachment feature and the second attachment feature opposite the first panel and the second panel, wherein the biaser seal includes (iii) an outer strip seal arranged in the slots formed in the first attachment feature and the second attachment feature that engages the ground component, and wherein the biaser of the biaser seal is configured to push the outer strip seal toward the ground component.

6. The gas turbine engine assembly of claim 5, wherein the outer strip seal overlaps the inner strip seal within the slots formed in the first attachment feature and the second attachment feature.

7. The gas turbine engine assembly of claim 5, wherein the biaser comprises a bent strip of single-thickness material formed to include an inner pusher portion located in the slots, an outer pusher portion located in the slots, and a spring portion interconnecting the inner pusher portion and the outer pusher portion, the inner pusher portion is arranged to engage the inner strip seal, the outer pusher portion is arranged to engage the outer strip seal, and wherein the spring portion is shaped to bias the inner pusher portion away from the outer pusher portion.

8. The gas turbine engine assembly of claim 7, wherein the spring portion is arranged outside the slots formed in the first attachment feature and the second attachment feature.

9. The gas turbine engine assembly of claim 7, wherein the spring portion is arranged inside the slots formed in the first attachment feature and the second attachment feature.

10. The gas turbine engine assembly of claim 7, wherein at least a portion of one of the inner strip seal and the outer strip seal is narrower than the inner pusher portion and the outer pusher portion of the biaser.

11. A gas turbine engine assembly, the assembly comprising
   a first component formed to include a first slot that extends into the first component,
   a second component formed to include a second slot that extends into the second component, the second component arranged adjacent to the first component to create an interface therebetween, and
   a biaser seal configured to block gasses from passing through the interface between the first component and the second component, the biaser seal including (i) a first strip seal arranged in the first slot formed in the first component and the second slot formed in the second component to close a gap between the first component and the second component and (ii) a biaser arranged, at least in part, in the first slot formed in the first component and the second slot formed in the second component, and the biaser is configured to push the first strip seal toward a first end of the respective first and second slots,
   wherein the first strip seal includes a seal strip and a step that extends from the seal strip, and the biaser engages the step of the first strip seal.

12. The gas turbine engine assembly of claim 11, wherein the step is one of integral to and brazed to the seal strip.

13. The gas turbine engine assembly of claim 11, wherein the biaser seal includes (iii) a second strip seal arranged in the first slot formed in the first component and the second slot formed in the second component to close a gap between the first component and the second component, and wherein the biaser of the biaser seal is configured to push the second strip seal toward a second end of the respective first and second slots, opposite the first end.

14. The gas turbine engine assembly of claim 13, wherein the second strip seal overlaps the first strip seal within the first slot and the second slot.

15. The gas turbine engine assembly of claim 13, wherein the biaser comprises a bent strip of single-thickness material formed to include an inner pusher portion located in the first slot and the second slot, an outer pusher portion located in the first slot and the second slot, and a spring portion interconnecting the inner pusher portion and the outer pusher portion, the inner pusher portion is arranged to engage the first strip seal, the outer pusher portion is arranged to engage the second strip seal, and wherein the spring portion is shaped to bias the inner pusher portion away from the outer pusher portion.

16. The gas turbine engine assembly of claim 15, wherein the spring portion is arranged outside the first slot formed in the first component and the second slot formed in the second component.

17. The gas turbine engine assembly of claim 15, wherein the spring portion is arranged inside the first slot formed in the first component and the second slot formed in the second component.

* * * * *